United States Patent [19]

Takarada et al.

[11] Patent Number: 5,468,825
[45] Date of Patent: Nov. 21, 1995

[54] COATING COMPOSITION FOR CARRIERS FOR USE IN ELECTROPHOTOGRAPHY AND CARRIERS USING THE SAME

[75] Inventors: Mitsuhiro Takarada, Takasaki; Yuji Yoshikawa; Kenji Yamamoto, both of Annaka, all of Japan

[73] Assignee: Shin-Etsu Chemical Co., Ltd., Tokyo, Japan

[21] Appl. No.: 185,354

[22] Filed: Jan. 24, 1994

[30] Foreign Application Priority Data

Jan. 22, 1993 [JP] Japan ................... 5-027557

[51] Int. Cl.⁶ .................................. C08G 77/08
[52] U.S. Cl. ........................... 528/15; 528/16; 528/17; 528/18; 528/19; 528/22; 528/34; 528/901
[58] Field of Search .................... 528/901, 34, 16, 528/17, 18, 19, 15, 22

[56] References Cited

U.S. PATENT DOCUMENTS

| | | | |
|---|---|---|---|
| 4,454,262 | 6/1984 | Fukayama et al. | 528/34 |
| 5,246,995 | 9/1993 | Murakami et al. | 528/901 |

FOREIGN PATENT DOCUMENTS

| | | |
|---|---|---|
| 54-21730 | 2/1979 | Japan . |
| 58-40557 | 3/1983 | Japan . |
| 59-53875 | 3/1984 | Japan . |
| 59-131944 | 7/1984 | Japan . |
| 59-26945 | 7/1984 | Japan . |
| 60-59369 | 4/1985 | Japan . |
| 273372 | 3/1990 | Japan . |
| 2103563 | 4/1990 | Japan . |

*Primary Examiner*—Melvyn I. Marquis
*Attorney, Agent, or Firm*—Lowe, Price, LeBlanc & Becker

[57] ABSTRACT

A coating composition for carriers which are adapted for use in electrophotography is described. The composition comprises an organopolysiloxane of the following average unit formula (1)

$$R^1_a Si(OR^2)_b O_{[4-(a+b)]/2} \qquad (1)$$

wherein $R^1$ represents an alkyl group having from 1 to 10 carbon atoms or a phenyl group, $R^2$ represents a hydrogen atom or an alkyl, alkenyl or alkoxyalkyl group, each having from 1 to 10 carbon atoms for the alkyl and alkenyl and from 2 to 10 carbon atoms for the alkoxyalkyl, a is a value of $0.8 \leq a \leq 1.8$, b is a value of $0<b<3$, an organosilane of the following general formula (2) serving as a crosslinking agent for the organopolysiloxane $$(CH_3)_2 SiX_2 \qquad (2)$$

wherein each X represents an alkenoxy group or oxime having from 2 to 10 carbon atoms, and a curing catalyst for the organopolysiloxane. Carriers having core particles and a cured film of the composition formed on individual particles are also described.

12 Claims, No Drawings

COATING COMPOSITION FOR CARRIERS FOR USE IN ELECTROPHOTOGRAPHY AND CARRIERS USING THE SAME

BACKGROUND OF THE INVENTION

1. Field of the Invention

This invention relates to coating compositions for electrophotographic carriers which can impart good durability to carriers on repeated use in duplication. The invention also relates to carriers for electrophotography which have core particles and a cover film formed on each particle from the coating composition.

2. Description of the Prior Art

As is well known in the art, the developers of two-component dry duplicators are usually made of two components including a fine toner and a larger-size carrier. On frictional mixing of these components under agitation, the toner and the carrier are electrostatically charged negatively and positively or vice versa, respectively. The thus charged toner is electrostatically deposited on the electrostatic latent image formed on a photosensitive material, thereby forming a visible image. The visible image is then transferred to a transfer sheet and fixed thereon, thereby achieving duplication.

In the case, the carrier used may be ordinarily made of oxidized or non-oxidized iron powder. If such an iron powder is used, as it is, by mixing with a toner, there arises the problem that the triboelectric charge characteristic against toner is not satisfactory and that the toner is fixedly deposited on the surfaces of the carrier during use, thereby forming a toner film (i.e., a spent phenomenon), so that the charge characteristic of the carrier varies as time passes, thus the life of the developer being shortened. Another problem is that a great difference in the charge characteristic appears between the carriers under dry and wet conditions.

To overcome the above problems, the current tendency is to cover the carrier particles with resins such as fluorine resins, acrylic resins, styrene-acrylic copolymers, silicone resins, polyester resins and the like.

However, the use of hydroxyl group-containing polyesters or acrylic resins is disadvantageous in that crosslinkage through isocyanates or melamines is essential as is set out, for example, in Japanese Laid-open Patent Application Nos. 59-53875 and 60-59369, and if the crosslinkage does not proceed to a full extent, unreacted hydroxyl groups and isocyanate groups remain in the cured product, degrading the charge characteristic.

Where acrylic resins or styrene-acrylic copolymers are used for the coverage, initial charge characteristics are good but the cover film made of these resins is relatively brittle, resulting in poor durability.

On the other hand, attention has now been directed to fluorine resins or silicone resins in that since their surface energy is small, the spent phenomenon may be lowered such as proposed in Japanese Laid-open Patent Application Nos. 54-21730 and 58-40557 and Patent Publication Nos. 59-26945 and 59-131944.

Especially, with the silicone resins, it is possible to design a diversity of molecular structures by proper selection of monomers. This leads to the fabrication of carriers which have a variety of charge levels depending on the selection of monomer. In addition, the silicone resins can be dissolved in diverse solvents, ensuring uniform application on the surfaces of carrier particles. Depending on the type of silicone resin, it will be possible to cure at relatively low temperatures. Thus, silicone resins have a number of advantages in view of handling and working properties.

However, known methyl-bearing silicone resins are disadvantageous in that when formed as a covering film, the resin is not high in mechanical strength although not so low as that of acrylic resins. During long-term use, the film will come off owing to the frictional abrasion, separation and cracking and thus loses its characteristic properties, with the lowering of copying performance. In this sense, the known silicone resins are not satisfactory with respect to the life in long-term use.

Several types of long-life coating compositions have been proposed such as, for example, in Japanese Laid-open Patent Application Nos. 2-73372 and 2-103563 but are not satisfactory in performance.

SUMMARY OF THE INVENTION

It is accordingly an object of the invention to provide a coating composition for electrophotographic carriers which can yield a cured film whereby the film is resistant to abrasion and is unlikely to separate from a carrier body and is also unlikely to suffer cracks therein, thus being durable in a long-term use.

It is another object of the invention to provide a coating composition for carriers capable of forming a cured film which can reliably prevent a spent phenomenon wherein toner particles are fixedly attached to the carrier surfaces.

It is a further object of the invention to provide a carrier for electrophotography which exhibits a small temperature dependence on charge characteristics and a long life.

The invention is based on the finding that when dimethyldiketoximesilanes or dimethyldialkenoxysilanes are used as a crosslinking agent in combination with a specific type of organopolysiloxane, individual carrier particles each having a cured film from such a combination as mentioned above exhibit good lubricity, water repellence, releasability and flowability while maintaining good charge characteristics of the silicone resin. At the same time, such a cured film on each carrier particle can well prevent the undesirable spent phenomenon, resulting in a prolonged life of the developer.

Hence, according to one embodiment of the invention, there is provided a coating composition for electrophotographic carrier which comprises:

100 parts by weight of an organopolysiloxane of the following average unit formula (1)

$$R^1_a Si(OR^2)_b O_{[4-(a+b)]/2} \qquad (1)$$

wherein $R^1$ represents an alkyl group having from 1 to 10 carbon atoms or a phenyl group, $R^2$ represents a hydrogen atom or an alkyl, alkenyl or alkoxyalkyl group, each having from 1 to 10 carbon atoms for the alkyl and alkenyl and from 2 to 10 carbon atoms for the alkoxyalkyl, a is a value of $0.8 \leq a \leq 1.8$, b is a value of $0 < b < 3$;

not less than 1 part by weight of a compound of the following general formula (2) serving as a crosslinking agent for the organopolysiloxane $$(CH_3)_2 SiX_2 \qquad (2)$$

wherein each X represents an alkenoxy group or oxime group having from 2 to 10 carbon atoms; and a curing catalyst for the organopolysiloxane.

According to another embodiment of the invention, there is also provided a carrier for electrophotography which comprises carrier core particles and a cured film covering the individual particles therewith, the cured film obtained from a coating composition as defined above.

DETAILED DESCRIPTION AND EMBODIMENTS OF THE INVENTION

The organopolysiloxane of the average unit formula (1) is one of the essential ingredients of the coating composition of the invention and constitutes a silicone resin covering the surfaces of the carrier core particles therewith. In the formula (1), $R^1_a Si(OR^2)_b O_{[4-(a+b)]/2}$, $R^1$ represents an alkyl group having from 1 to 10 carbon atoms or a phenyl group as set out above. From the industrial standpoint, $R^1$ preferably represents a methyl group or a phenyl group. Likewise, $R^2$ represents a hydrogen atom or an alkyl, alkenyl or alkoxyalkyl group, each having from 1 to 10 carbon atoms for the alkyl and alkenyl and from 2 to 10 carbon atoms for the alkoxyalkyl group. In view of the industrial standpoint, it is preferred that $R^2$ represents a lower alkyl group having from 1 to 4 carbon atoms such as methyl, ethyl, isopropyl or iso-butyl.

The organopolysiloxanes useful in the present invention can be readily obtained by subjecting one or more of chlorosilanes and/or alkoxysilanes to hydrolysis. Examples of such chlorosilanes include methyltrichlorosilane, dimethyldichlorosilane, diphenyldichlorosilane, phenyltrichlorosilane, phenylmethyldichlorosilane, tetrachlorosilane and the like. Examples of the alkoxysilanes include methyltrialkoxysilanes, dimethyldialkoxysilanes, diphenyldialkoxysilanes, phenyltrialkoxysilanes, phenylmethyldialkoxysilanes, tetraalkoxysilanes and the like. The alkoxy group in the alkoxysilanes has 1 to 6 carbon atoms and include, for example, methoxy, ethoxy, propoxy, butoxy and the like. These chlorosilanes and alkoxysilanes may be used singly or in combination, respectively. Alternatively, the organopolysiloxanes may be obtained through equilibration reaction of tetraalkoxysilanes, trialkoxysilanes or cyclic polysiloxanes.

In the formula (1), a and b should, respectively, be such values that $0.8 \leq a \leq 1.8$ and $0 < b < 3$. These ranges of the values may be readily attained by appropriately controlling the type and the amount by mole of silane monomer. Preferably, $0.9 \leq a \leq 1.3$ and $0 < b < 1.2$.

The organosilane of the general formula (2) used as one of the essential ingredients of the composition includes dimethyldiketoximesilanes and dimethyldialkenoxysilanes. The organosilane serves as a bifunctional crosslinking agent capable of crosslinking reaction with the organopolysiloxane. When using the bifunctional crosslinking agent, there can be formed a cured film which is better in lubricity, water repellence, releasability, moisture proofing and charge characteristics than in the case using conventionally employed trifunctional or tetrafunctional organosilanes.

In the formula (2), X represents an alkenoxy group or oxime group having form 2 to 10 carbon atoms. Examples of the alkenoxy group include a vinyloxy group, an iso-propenoxy group, a butenoxy group, an iso-butenoxy group, a cyclohexenoxy group and the like. Examples of the oxime group include a methyloxime group, a dimethyloxime group, a methylethyloxime group, a tetramethyleneoxime group, a pentamethyleneoxime group, a phenyloxime group and the like.

Of these, it is preferred from the industrial standpoint to use an iso-propenoxy group, an iso-butenoxy group, a methylethyloxime group or a methyl-iso-butyloxime group.

The amount of the organosilane is not critical and is generally in the range not less than 1 part by weight per 100 parts by weight of the organopolysiloxane. From the standpoint that good crosslinking properties and storage stability are attained, the amount ranges from 3 to 50 parts by weight per 100 parts by weight of the organopolysiloxane. In order to further increase the storage stability, trifunctional oximesilanes or alkenoxysilanes, or tetrafunctional silanes may be used in combination in an amount of 15 to 100 parts by weight per 100 parts by weight of the organopolysiloxane. Specific examples of the trifunctional oximesilanes or alkenoxysilane and the tetrafunctional silanes include methyl tris-isopropenoxysilane, methyl tris-isobutenoxysilane, methyl tris-methylethylketoximesilane, methyl tris-methylisobutyloximesilane, vinyl tris-isopropenoxysilane, vinyl tris-isobutenoxysilane, vinyl tris-methylethylketoximesilane, vinyl tris-methylisobutyloximesilane, tetraisopropenoxysilane, tetraisobutenoxysilane, tetramethylethylketoximesilane, tetramethylisobutyloximesilane, and the like. These may be used singly or in combination.

The curing catalyst used in the present invention may be those used ordinarily employed for organopolysiloxanes of the type used in the present invention and should preferably be organotitanium, organotin, organozinc, organocobalt, organoiron and organoaluminum compounds or aminosilanes. These may be used singly or in combination. Such organometallic compounds or aminosilanes include, for example, tetrabutyl titanate or a homopolymer thereof, tetra-iso-propyl titanate or its homopolymer, dibutyltin diacetate, dibutyltin dioctoate, dibutyltin laurate, naphthenoates or octylates of zinc, cobalt, iron and the like metals, γ-aminopropyltrimethoxysilane, γ-aminopropyltriethoxysilane, N-(β-aminoethyl)aminopropyltrimethoxysilane, γ-aminopropylmnethyldiethoxysilane, N-(β-aminoethyl)aminopropylmethyldimethoxysilane and the like.

The amount of the curing catalyst should preferably be in the range of from 0.05 to 5.0 wt % based on the resin solid.

The coating composition of the invention may be curable at normal temperatures and is preferably heated for curing to a temperature of 100° to 250° C. for 5 to 120 minutes in order to stabilize the film characteristics and increase the productivity.

In accordance with another embodiment of the invention, the coating composition is applied to individual carrier core particles to form a cover film on each core particle, thereby obtaining a carrier. The core particles are made typically of iron or ferrites. Besides, there may be used other known core particles made of magnetic metals such as nickel, cobalt and the like, oxides of such magnetic metals, copper, carbonrundum, glass beads, silicon dioxide, and the like.

The core particles generally have a size of from 10 to 1,000 μm, preferably from 50 to 300 μm.

In the practice of the invention, the coating composition may be applied after dissolution in organic solvents, if necessary. Examples of such solvents include hydrocarbon solvents such as toluene, xylene, gasoline and the like, alcohols, esters and the like. The composition may be applied onto individual core particles by any known methods such as a fluidized bed method, an immersion method, a spray method and the like. The thus applied particles are then dried and cured at 100° to 250° C. as set out hereinbefore.

The film thickness should preferably be controlled in the range of from 0.1 to 20 μm. If necessary, the composition may be re-applied onto once applied particles for forming a double-layer or multiple layer structure. In the case, the respective layers on each particle may be made of different coating compositions.

The toners used in combination with the carrier according to the invention is not critical in type. Ordinary toners may be used to provide a developer for electrophotography. More particularly, the toner may be made of a resin selected from natural resins and combinations of natural and synthetic resins, modifiers, and known synthetic dyes or pigments dispersed in the resin and modifiers.

The invention is more particularly described by way of examples, which should not be construed as limiting the invention thereto. Comparative examples are also shown. In examples and comparative examples, parts are by weight unless otherwise indicated.

EXAMPLE 1

A mixture of 5 parts of a crosslinking agent of the following formula (3) and 0.5 parts of dibutyltin octoate, and ligroin were added to 100 parts of a toluene solution of 50 wt % of an organopolysiloxane of the average unit formula, $CH_3Si(OH)_{0.2}O_{1.4}$, thereby obtaining a silicone coating solution containing 10 wt % of the organopolysiloxane

Thereafter, the silicone coating solution was applied onto ferrite particles, i.e. carrier core particles, with an average size of 100 μm by use of a fluidized bed apparatus (SPIR-A-FLOW MINI available from Freund Ind. Co., Ltd.) in an amount of 20 g of the silicone per kg of the ferrite, thereby forming a silicone film on the individual particles. The thus applied particles were heated at 150° C. for 30 minutes to cure the silicone ingredient, after which partly coagulated particles were broken into pieces by means of a mortar to obtain Carrier 1.

1.2 parts of a positive charging black toner (Able 3300/1300 series cartridge (Black) available from Fuji Xerox Co., Ltd.) were mixed with 30 parts of Carrier 1 obtained above, followed by shaking for charging. Subsequently, the initial charge of Carrier 1 was measured by use of a Blow-Off Powder Charge Measuring Device of Toshiba Chemical Co., Ltd.

Moreover, 1 kg of Carrier 1 and 5 g of the above toner were placed in a force-degrading ceramic device with a capacity of 500 ml, followed by violent shaking through horizontal reciprocating movements at a rate of 370 vibrations per minute with a horizontal vibration amplitude of 4 cm. The force-degrading test was continued over 10 hours. Thereafter, the electric charge of Carrier 1 was measured. It will be noted that 30 minutes of the force-degrading test approximately correspond to 5000 copying cycles or copies in an actual copying machine.

The results are shown in Table 1.

EXAMPLE 2

The general procedure of Example 1 was repeated using, instead of the crosslinking agent of the formula (3) used in Example 1, a crosslinking agent of the following formula (4), thereby obtaining Carrier 2

Carrier 2 was subjected to measurement of an initial charge and a charge after forced degradation in the same manner as in Example 1. The results are shown in Table 1.

EXAMPLE 3

The general procedure of Example 1 was repeated except that there was used an organopolysiloxane of the formula, $(CH_3)_{1.15}Si(OH)_{0.25}O_{1.8}$, instead of the organopolysiloxane of Example 1 and that the crosslinking agent of the formula (3) in Example 1 was used in an amount of 5 parts along with 10 parts of a crosslinking agent of the following formula (5), thereby obtaining Carrier 3

The thus obtained carrier was subjected to measurement of an initial charge and a charge after forced degradation. The results are shown in Table 1.

Comparative Example 1

The general procedure of Example 1 was repeated except that the crosslinking agent of the formula (5) used in Example 3 was used instead of the agent of the formula (3), thereby obtaining Carrier 4. Carrier 4 was subjected to measurement of an initial charge and a charge after the forced degradation in the same manner as in Example 1. The results are shown in Table 1.

Comparative Example 2

The general procedure of Example 3 was repeated except that parts of the agent of the formula (5) was used instead of the mixture of 5 parts of the agent of the formula (3) and 10 parts of the agent of the formula (5) used in Example 3, thereby obtaining Carrier 5. Carrier 5 was subjected to measurement of an initial charge and a charge after the forced degradation. The results are shown in Table 1.

TABLE 1

| | Carrier No. | Initial Charge (μc/g) | Charge 10 Hours After Force-degradation (μc/g) |
|---|---|---|---|
| Example 1 | 1 | −18.2 | −20.5 |
| Example 2 | 2 | −16.7 | −19.1 |
| Example 3 | 3 | −20.4 | −19.2 |
| Comparative Example 1 | 4 | −14.2 | −8.4 |
| Comparative Example 2 | 5 | −15.4 | −11.1 |

From the results of Table 1, where the organosilanes of the formula (2) (e.g. the compounds of the formulas (3) and (4) in the examples of the invention) are not used, the initial charge is low and the charge after the degradation test significantly lowers. Thus, such carriers do not stand use in developers. In contrast, when the organosilanes of the type represented by the formula (2) are used according to the invention, evidence is given that after the force-degradation test, the charge is at a satisfactory level.

What is claimed is:

1. A coating composition for an electrophotographic carrier, which coating composition comprises:

100 parts by weight of an organopolysiloxane of the following average unit formula (1)

$$R^1_a Si(OR^2)_b O_{[4-(a+b)]/2} \quad (1)$$

wherein $R^1$ represents an alkyl group having from 1 to 10 carbon atoms or a phenyl group, $R^2$ represents a hydrogen atom or an alkyl, alkenyl or alkoxyalkyl group, each having from 1 to 10 carbon atoms for the alkyl and alkenyl and from 2 to 10 carbon atoms for the alkoxyalkyl, a is a value of $0.9 \leq a \leq 1.3$, and b is a value of $0 < b < 1.2$;

not less than 1 part by weight of an organosilane of the following general formula (2) serving as a crosslinking agent for the organopolysiloxane $$(CH_3)_2 SiX_2 \quad (2)$$

wherein each X represents an alkenoxy group or oxime having from 2 to 10 carbon atoms; and a catalyst for curing the organopolysiloxane, said catalyst being selected from the group consisting of organotitanium, organotin, organozinc, organocobalt, organoiron and organoaluminum compounds, and aminosilanes and mixtures thereof.

2. A coating composition according to claim 1, wherein $R^1$ represents a methyl group.

3. A coating composition according to claim 1, wherein $R^1$ represents a phenyl group.

4. A coating composition according to claim 1, wherein $R^2$ represents a hydrogen atom.

5. A coating composition according to claim 1, wherein $R^2$ represents a lower alkyl group having from 1 to 4 carbon atoms.

6. A coating composition according to claim 1, wherein said organosilane is present in an amount of from 3 to 50 parts by weight.

7. A coating composition according to claim 1, wherein X represents an alkenoxy group.

8. A coating composition according to claim 7, wherein said alkenoxy group is an iso-propenoxy group.

9. A coating composition according to claim 1, wherein X represents an oxime group.

10. A coating composition according to claim 1, wherein said oxime group is a methylethyloxime group.

11. A coating composition according to claim 1, further comprising at least one member selected from the group consisting of trifunctional and tetrafunctional oximesilanes and alkenoxysilanes in an amount of 15 to 100 parts by weight by weight of said organopolysiloxane.

12. A coating composition according to claim 1, wherein said curing catalyst is present in an amount of from 0.05 to 5.0 wt % based on the organopolysiloxane.

* * * * *